Figure 1:
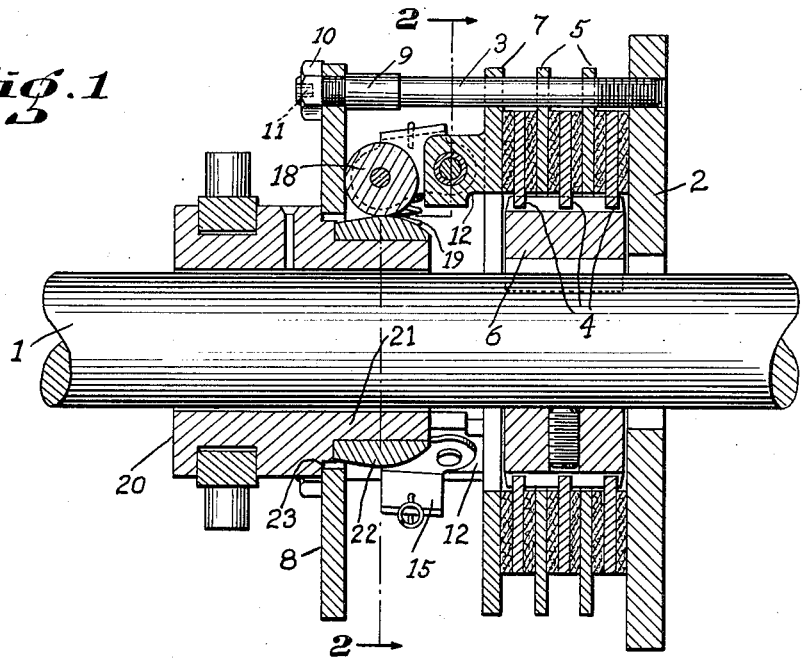

July 31, 1945.   J. T. BARRON   2,380,571
CLUTCH
Filed April 14, 1943

INVENTOR.
John T. Barron
BY Spear, Rawlings & Spear
ATTORNEY

Patented July 31, 1945

2,380,571

UNITED STATES PATENT OFFICE 2,380,571

CLUTCH

John T. Barron, Boston, Mass., assignor to Kinney Manufacturing Company, Jamaica Plain, Mass., a corporation of Massachusetts Application April 14, 1943, Serial No. 482,988

6 Claims. (Cl. 192—111)

My present invention relates to an efficient clutch providing simplicity and economy in its construction and adaptability to a wide range of uses.

Clutches in accordance with my invention include a pair of members to be coupled. One of these slidably carries at least one clutch element and the clutch operating means. The other member establishes a backing member into which are threaded a plurality of bolts disposed in parallel with its axis. These bolts serve to slidably support the thrust plate which carries pivoted thrust members to engage, when actuated by the operating means, with an adjusting or thrust plate fixed on the bolts with the resulting thrust effecting clutch engagement.

Clutches in accordance with my invention have several important advantages. One of these is that the bolts may be threaded into any suitable surface of one of the elements to be coupled to utilize such a surface as the backing element and because the plates are made ready for assembly by drilling holes, adjacent their peripheries, to receive the bolts, the clutches are simple and inexpensive to manufacture, assemble and service. Since the bolts constitute a supporting frame both for the slidable plates and the fixed thrust plate, an existing housing may be used or a separate housing may be provided, if desired, without altering the clutch construction.

While clutches in accordance with my invention may be variously made, I have shown my invention in the accompanying drawing to illustrate its novel features and advantages as embodied in a clutch of the type shown in the patent to Livingston, No. 2,276,276, of March 17, 1942.

Figure 2:
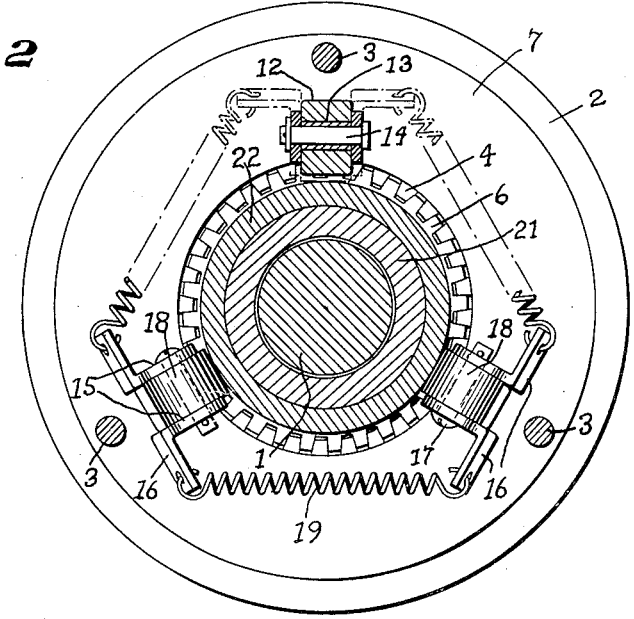

In the drawing:

Fig. 1 is a partly sectioned view of a clutch assembly in accordance with my invention, and Fig. 2 is a section along the lines 2—2 of Fig. 1.

As indicative of the pair of members to be coupled, I have shown a shaft 1 and a plate 2 which may be attached to, or may be considered as representative of, an end wall of a winch drum, a fly wheel, pulley, or the like. The plate 2 constitutes a backing plate and in accordance with my invention I provide it with a plurality of supports disposed in parallel to the axis of the shaft 1 and these supports may be in the form of bolts 3 threaded into the plate 2.

The clutch shown in the drawing employs a plurality of clutch plates 4 and 5. The clutch plates 4 are slidably carried by the shaft 1 in any desired way as by supporting them on a gear 6 fast on the shaft 1. The clutch plates 5 are drilled adjacent their peripheries to provide holes to receive the bolts 3 so that they are slidably carried thereby.

The pressure plate 7 and the thrust plate 8 are similarly formed with bolt receiving holes so that they may freely receive the bolts 3. While the pressure plate 7 is slidably supported by the bolts 3, I clamp the thrust plate 8 against the stops 9, with which the bolts 3 have a driving fit, by nuts 10. The exposed ends of the bolts 3 may be formed as at 11 for wrench engagement to facilitate their rotation during assembly or adjustment of the clutch.

The pressure plate 7 has a plurality of spaced lugs 12 bored to receive bushings 13 for the pins 14 which pivotally support thrust members which are adapted to engage with the thrust plate 8 and, on such engagement, to thrust the plate 7 to effect clutch engagement. The thrust members may each comprise a pair of side plates 15 pivotally supported by the pins 14 and having laterally disposed flanges 16. A pin 17 carried by the front end of the plates 15 supports a roller 18. Each flange 16 of each thrust member is connected to the adjacent flange of an adjacent thrust member by a spring 19 to urge the thrust members into an inoperative position against the influence of centrifugal force when the plate 7 is rotated. In practice, movement of the thrust members by the springs 19 is limited by utilizing the lugs 12 as seats with which the rollers engage when the clutch is disengaged.

The thrust members are actuated by a shifter collar 20 slidably supported on the shaft 1 and adapted to be actuated by any desired shifting mechanism. I form the collar 20 with a head 21 which has a cam 22 thereon. The thrust plate 8 is spaced from the shaft 1 to accommodate the head which is adapted to wedge the thrust members into contact with the thrust disc 8 thereby to actuate the pressure plate to effect clutch engagement. When the clutch is engaged, an annular shoulder 23 on the collar 20 butts against the lower part of the thrust disc 8.

If desired, the clutch may be housed or an existing housing may be used without change in the clutch construction. In accordance with my invention, the use of detachable supports to slidably carry both the clutch and pressure plates and to rigidly support a thrust plate make it possible to simplify clutch construction while combining efficiency of operation with economy in manufacture and ease of assembly and service.

What I therefore claim and desire to secure by Letters Patent is:

1. A clutch comprising a pair of members to be coupled, one of said members including an annular backing element, a plurality of bolts threaded into said backing element in parallel with the axis of said other member, a set of clutch plates, some of said clutch plates being slidably mounted on said bolts and some of said clutch plates being slidably supported on said other member, and thrust means to clamp said clutch plates together, said thrust means comprising a thrust plate fixed on said bolts but permitting said bolts to be adjusted to vary the relation of said thrust plate to said backing element thereby to adjust the torque capacity of the clutch, a pressure plate slidably carried by said bolts between said thrust plate and said clutch plates, and thrust members interposed between said pressure and thrust plates to have a normal inoperative position and an operative position in which they react against said thrust plate to effect a clutch engaging thrust on said pressure plate, and operator controlled means slidably supported by said other member to carry said thrust members from their inoperative to their operative position.

2. The clutch of claim 1 in which the clutch plates carried by the bolts, the thrust plate and the pressure plate have bolt receiving holes adjacent their peripheries.

3. A clutch comprising a pair of members to be coupled, one of said members constituting a backing element, a plurality of spaced bolts threaded into said element in parallel with the axis of the other of said members, a clutch plate slidably carried by said other member, and means to clamp said clutch plate against said backing element, said clamping means comprising a pressure plate slidably carried by said bolts, a thrust plate on said supports, a stop on each of said bolts and a nut on each bolt locking said thrust plate against said stops and holding said bolts against rotation but permitting manual adjustment of the relation of said thrust plate to said backing element thereby to adjust the torque capacity of the clutch, said stops being spaced sufficiently from said pressure plate to permit said adjustment without interference with said pressure plate, and thrust means pivotally carried by said pressure plate for movement into contact with said thrust plate and on such movement to thrust said pressure plate into clamping position and operator controlled means to actuate said clamping means, said operator controlled means including a thrust means engaging member supported by said other member to slide into and out of a position wherein said thrust means contact said thrust plate.

4. A clutch comprising a pair of members to be coupled, one of said members including an annular backing element, a plurality of bolts threaded into said backing element in parallel with the axis of said other member, a clutch plate slidable on said bolts, a clutch plate slidable on said other member, and thrust means to clamp said clutch plates together, said thrust means comprising a thrust plate, means locking said thrust plate to said bolts to have a fixed position thereon but permitting said bolts to be threaded into or out of said backing element when said means are unlocked thereby to adjust the torque capacity of the clutch, a pressure plate slidable on said bolts between said thrust plate and said clutch plates, and thrust members interposed between said pressure and thrust plates to have a normal inoperative position and an operative position in which they react against said thrust plate to effect a clutch engaging thrust on said pressure plate, and operator controlled means slidably supported by said other member to carry said thrust members from their inoperative to their operative position.

5. The clutch of claim 4 in which the pressure plate has spaced apertures adjacent its periphery to receive said bolts.

6. In a clutch to connect a pair of rotatable members, a shifter having an operative and an inoperative position, a clutch element slidably supported by one of said members, and means to clamp said clutch element to the other of said members, said means comprising a first element, a plurality of spaced bolts threaded into said element in parallel with the axis of said members, a second element apertured to slidably receive said bolts, one of said elements being rotated with said other member, and a third element locked on said bolts to have a fixed position thereon but permitting said bolts to be threaded into or out of said first element when the torque capacity of the clutch is to be adjusted, and thrust means actuated by said shifter carried by one of the two last named elements to react against the other of said two last named elements to cause relative movement thereby to clamp said clutch element between said first and second elements.

JOHN T. BARRON.